(12) United States Patent
Hall et al.

(10) Patent No.: US 9,156,703 B2
(45) Date of Patent: Oct. 13, 2015

(54) SYSTEM AND METHOD FOR PRODUCING CARBON DIOXIDE

(71) Applicant: The Boeing Company, Chicago, IL (US)

(72) Inventors: John C. Hall, Rancho Palos Verdes, CA (US); D. Anthony Galasso, Trabuco Canyon, CA (US); Jon A. Magnuson, Corona del Mar, CA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 13/767,151

(22) Filed: Feb. 14, 2013

(65) Prior Publication Data

US 2013/0255597 A1 Oct. 3, 2013

Related U.S. Application Data

(60) Provisional application No. 61/618,394, filed on Mar. 30, 2012, provisional application No. 61/692,590, filed on Aug. 23, 2012.

(51) Int. Cl.
*B01D 53/02* (2006.01)
*C01B 31/20* (2006.01)
*B01D 53/04* (2006.01)
(Continued)

(52) U.S. Cl.
CPC ............... *C01B 31/20* (2013.01); *B01D 53/04* (2013.01); *B01D 53/261* (2013.01); *B01D 53/265* (2013.01); *B01D 53/885* (2013.01); *B01D 2253/108* (2013.01); *B01D 2255/802* (2013.01); *B01D 2256/22* (2013.01); *B01D 2257/504* (2013.01); *B01D 2258/018* (2013.01); *B01D 2258/0283* (2013.01);
(Continued)

(58) Field of Classification Search
CPC ............... B01D 2253/108; B01D 2255/802; B01D 2256/22; B01D 2257/504; B01D 2258/018; B01D 2258/0283; B01D 2259/416; B01D 53/04; B01D 53/261; B01D 53/265; B01D 53/885; C01B 31/20; Y02C 10/04; Y02C 10/08
See application file for complete search history.

(56) References Cited

U.S. PATENT DOCUMENTS 3,359,707 A 12/1967 Louis
3,493,339 A 2/1970 Wheldon et al.
(Continued)

FOREIGN PATENT DOCUMENTS

DE 4003533 8/1990
DE 4003533 A1 8/1990
(Continued)

OTHER PUBLICATIONS

Extended European Search Report issued in EP12180636.8 (Dec. 14, 2012).
(Continued)

*Primary Examiner* — Christopher P Jones
(74) *Attorney, Agent, or Firm* — Walters & Wasylyna LLC

(57) ABSTRACT

A system for producing carbon dioxide including a collection subsystem configured to collect a process gas, the process gas including a hydrocarbon, a combustion subsystem configured to combust the hydrocarbon in the process gas and output a gaseous combustion effluent, wherein the gaseous combustion effluent includes carbon dioxide and water, and a separation subsystem configured to separate the carbon dioxide from the gaseous combustion effluent.

16 Claims, 6 Drawing Sheets

(51) Int. Cl.
*B01D 53/26* (2006.01)
*B01D 53/88* (2006.01)

(52) U.S. Cl.
CPC .......... *B01D 2259/416* (2013.01); *Y02C 10/04* (2013.01); *Y02C 10/08* (2013.01)

(56) References Cited

U.S. PATENT DOCUMENTS

| | | | |
|---|---|---|---|
| 3,660,967 | A | 5/1972 | Collins et al. |
| 3,853,507 | A | 12/1974 | Monroe et al. |
| 4,094,652 | A | 6/1978 | Lowther |
| 4,249,915 | A | 2/1981 | Sircar et al. |
| 4,312,641 | A | 1/1982 | Verrando et al. |
| 4,322,394 | A | 3/1982 | Mezey et al. |
| 4,484,933 | A * | 11/1984 | Cohen ............................. 95/124 |
| 4,551,197 | A | 11/1985 | Guilmette et al. |
| 4,726,815 | A | 2/1988 | Hashimoto et al. |
| 4,784,672 | A | 11/1988 | Sircar |
| 4,797,141 | A | 1/1989 | Mercader et al. |
| 4,832,711 | A | 5/1989 | Christel et al. |
| 5,059,405 | A | 10/1991 | Watson et al. |
| 5,100,635 | A | 3/1992 | Krishnamurthy et al. |
| 5,221,520 | A | 6/1993 | Cornwell |
| 5,232,474 | A | 8/1993 | Jain |
| 5,233,837 | A | 8/1993 | Callahan |
| 5,261,250 | A | 11/1993 | Missiner |
| 5,282,886 | A | 2/1994 | Kobayashi et al. |
| 5,749,230 | A * | 5/1998 | Coellner et al. .................. 62/94 |
| 6,022,399 | A | 2/2000 | Ertl et al. |
| 6,027,548 | A | 2/2000 | Ackley et al. |
| 6,183,539 | B1 | 2/2001 | Rode et al. |
| 6,293,999 | B1 | 9/2001 | Cheng et al. |
| 6,332,925 | B1 | 12/2001 | Noji et al. |
| 6,337,063 | B1 | 1/2002 | Rouleau et al. |
| 6,502,328 | B1 | 1/2003 | Love et al. |
| 6,621,848 | B1 | 9/2003 | Ullman et al. |
| 6,706,097 | B2 | 3/2004 | Zornes |
| 6,712,879 | B2 | 3/2004 | Kato et al. |
| 7,736,416 | B2 | 6/2010 | Nalette et al. |
| 7,947,120 | B2 | 5/2011 | Deckman et al. |
| 8,435,335 | B2 | 5/2013 | Lam et al. |
| 2001/0009124 | A1 | 7/2001 | Suzuki et al. |
| 2005/0121393 | A1 | 6/2005 | Galbraith |
| 2007/0231233 | A1 | 10/2007 | Bose |
| 2008/0000351 | A1 | 1/2008 | Celik et al. |
| 2008/0200742 | A1 | 8/2008 | Doyle et al. |
| 2008/0314245 | A1 | 12/2008 | Hershkowitz et al. |
| 2009/0232861 | A1 | 9/2009 | Wright et al. |
| 2009/0294366 | A1 | 12/2009 | Wright et al. |
| 2009/0311146 | A1 | 12/2009 | Ohno et al. |
| 2010/0000221 | A1 | 1/2010 | Pfefferle |
| 2010/0024476 | A1 | 2/2010 | Shah |
| 2010/0251887 | A1 | 10/2010 | Jain |
| 2010/0251937 | A1 | 10/2010 | Murray et al. |
| 2010/0284904 | A1 | 11/2010 | Castaldi et al. |
| 2011/0088550 | A1 * | 4/2011 | Tirio ................................ 95/96 |
| 2011/0107914 | A1 | 5/2011 | Su et al. |
| 2011/0189075 | A1 | 8/2011 | Wright et al. |
| 2011/0247491 | A1 | 10/2011 | Leitgeb et al. |
| 2011/0296872 | A1 | 12/2011 | Eisenberger |
| 2012/0000365 | A1 | 1/2012 | Okano et al. |
| 2012/0017638 | A1 | 1/2012 | Prast et al. |
| 2012/0048111 | A1 * | 3/2012 | Nakao et al. ..................... 95/139 |
| 2012/0204720 | A1 | 8/2012 | Tschantz et al. |
| 2013/0047664 | A1 | 2/2013 | DiCenzo |
| 2013/0192296 | A1 | 8/2013 | Betting et al. |
| 2014/0053761 | A1 | 2/2014 | Galasso |

FOREIGN PATENT DOCUMENTS

| | | |
|---|---|---|
| GB | 2171927 | 9/1986 |
| WO | WO 2012/013596 | 2/2012 |
| WO | WO 2012/030223 | 3/2012 |
| WO | WO 2013/010328 | 1/2013 |

OTHER PUBLICATIONS

Amato et al., "Methane Oxycombustion for Low $CO_2$ Cycles: Blowoff Measurements and Analysis," *Journal of Engineering for Gas Turbines and Power*, vol. 133 (Jun. 2011).

Smardzewski et al., "A Laboratory Study of the Dielectric Heating of Molecular Sieve Material," *Naval Research Laboratory*, (May 27, 1980).

Choi et al., "Adsorbent Materials for Carbon Dioxide Capture from Large Anthropogenic Sources," *ChemSusChem Journal*, vol. 2, pp. 796-854 (2009).

Konduru et al., "Curbing Greenhouse Effect by Carbon Dioxide Adsorption with Zeolite 13x," *AIChE Journal*, vol. 53, No. 12 (2007).

Cavenati et al., "Adsorption Equilibrium of Methane, Carbon Dioxide, and Nitrogen on Zeolite 13X at High Pressures," Journal of Chemical Engineering Data, vol. 49, pp. 1095-1101 (2004).

Siemons et al., "Assessing the Kinetics and Capability of Gas Adsorption in Coals by a Combined Adsorption/Diffusion Method," *SPE Annual Technical Conference and Exhibition* (Denver, CO, 2003).

Extended European Search Report, EP 13 16 0181 (2013).

* cited by examiner

SYSTEM AND METHOD FOR PRODUCING CARBON DIOXIDE

PRIORITY

This application claims priority from U.S. Ser. No. 61/618,394 filed on Mar. 30, 2012, and U.S. Ser. No. 61/692,590 filed on Aug. 23, 2012.

FIELD

This application relates to carbon dioxide production and, more particularly, to systems and methods for generating and separating carbon dioxide.

BACKGROUND

A significant amount of carbon dioxide is used in enhanced oil recovery ("EOR"). An oil well typically collects approximately 30 percent of its oil from an underground oil reservoir during the primary recovery phase. An additional 20 percent of the oil may be recovered using secondary recovery techniques, such as water flooding that raises the underground pressure. The EOR process provides a tertiary recovery technique capable of recovering an additional 20 percent or more of the oil from the underground reservoir.

During the EOR process, large quantities of carbon dioxide are injected into the underground oil reservoir, thereby urging additional oil from the well. Carbon dioxide is a preferred EOR gas due to its ability to mix with the underground oil and render the oil less viscous and more readily extractable.

The carbon dioxide used in EOR processes may be obtained from various sources using various techniques. For example, carbon dioxide may be collected from natural sources, such as ambient air, or may be collected as a byproduct of various industrial purposes, such as fermentation. Unfortunately, traditional carbon dioxide production techniques are energy intensive, particularly when run on an industrial scale. Furthermore, the cost of transporting carbon dioxide from the production site to the EOR site (e.g., by freight or pipeline) is quite significant.

Accordingly, those skilled in the art continue with research and development efforts in the field of carbon dioxide production, collection and delivery.

SUMMARY

In one embodiment, the disclosed system for producing carbon dioxide may include a collection subsystem configured to collect a process gas, the process gas including a hydrocarbon, a combustion subsystem configured to combust the hydrocarbon in the process gas and output a gaseous combustion effluent, wherein the gaseous combustion effluent includes carbon dioxide and water, and a separation subsystem configured to separate the carbon dioxide from the gaseous combustion effluent.

In another embodiment, the disclosed system for producing carbon dioxide may include a collection subsystem configured to collect a process gas, the process gas including methane, a combustion subsystem configured to combust the methane and output a gaseous combustion effluent, wherein the gaseous combustion effluent includes carbon dioxide and water, and a separation subsystem configured to separate the carbon dioxide from the gaseous combustion effluent, the separation subsystem including a zeolite.

In another embodiment, the disclosed method for producing carbon dioxide may include the steps of (1) providing a process gas including a hydrocarbon, (2) combusting the hydrocarbon to generate electrical energy and a gaseous combustion effluent, wherein the gaseous combustion effluent includes carbon dioxide and water, and (3) separating the carbon dioxide from the gaseous combustion effluent.

In another embodiment the disclosed method for producing carbon dioxide may include the steps of (1) providing a gaseous mixture including carbon dioxide and water, (1) removing at least a portion of the water from the gaseous mixture to form a substantially dry gaseous mixture, and (3) adsorbing at least a portion of the carbon dioxide from the dry gaseous mixture onto an adsorbent material.

In another embodiment the disclosed method for producing carbon dioxide may include the steps of (1) providing a gaseous mixture including carbon dioxide and water, (1) removing at least a portion of the water from the gaseous mixture to form a substantially dry gaseous mixture, and (3) adsorbing at least a portion of the carbon dioxide from the dry gaseous mixture onto an adsorbent material, and (4) desorbing the adsorbed carbon dioxide from the adsorbent material.

In another embodiment, the disclosed method for producing carbon dioxide may include the steps of (1) providing a gaseous mixture that includes carbon dioxide, (1) removing heat from the gaseous mixture, (3) adsorbing at least a portion of the carbon dioxide from the gaseous mixture onto an adsorbent material and, optionally, (4) transferring the removed heat.

In another embodiment, the disclosed method for producing carbon dioxide may include the steps of (1) providing a gaseous mixture that includes carbon dioxide and water, (1) removing heat from the gaseous mixture, (3) transferring at least a portion of the water from the gaseous mixture to a desiccant material to form a substantially dry gaseous mixture, (4) adsorbing at least a portion of the carbon dioxide from the dry gaseous mixture onto an adsorbent material and, optionally, (5) transferring the removed heat.

In another embodiment, the disclosed method for producing carbon dioxide may include the steps of (1) providing a gaseous mixture that includes carbon dioxide and water, (1) removing heat from the gaseous mixture, (3) transferring at least a portion of the water from the gaseous mixture to a desiccant material to form a substantially dry gaseous mixture, (4) adsorbing at least a portion of the carbon dioxide from the dry gaseous mixture onto an adsorbent material, and (5) transferring the removed heat to at least one of the desiccant material and the adsorbent material.

In another embodiment, the disclosed system for producing carbon dioxide from a gaseous mixture may include (1) a condenser for removing heat from the gaseous mixture, wherein the condenser condenses water vapor in the process gas, (1) a desiccant material for removing additional water from the gaseous mixture to produce substantially dry gas, (3) an adsorbent material for adsorbing carbon dioxide from the dry gas, (4) a vacuum chamber for evacuating the adsorbed carbon dioxide from the adsorbent material and transitioning the evacuated carbon dioxide from a gas to a solid, and (5) a heat transfer assembly for collecting the heat removed from the gaseous mixture and transferring the removed heat.

In another embodiment, the disclosed system for producing carbon dioxide from a gaseous mixture may include (1) a condenser for removing heat from the gaseous mixture, wherein the condenser condenses water vapor in the gaseous mixture, (1) a desiccant material for removing additional water from the gaseous mixture to produce substantially dry gas, (3) an adsorbent material for adsorbing carbon dioxide from the dry gas, (4) a vacuum chamber for evacuating the adsorbed carbon dioxide from the adsorbent material and transitioning the evacuated carbon dioxide from a gas to a solid, and (5) a heat transfer assembly for collecting the heat removed from the gaseous mixture and transferring the removed heat to the desiccant material and/or the adsorbent material.

In yet another embodiment, the disclosed method for producing carbon dioxide may include the steps of (1) providing a process gas including methane, (1) combusting the hydrocarbon to generate electrical energy and a gaseous combustion effluent, wherein the gaseous combustion effluent includes carbon dioxide and water, and (3) separating the carbon dioxide from the gaseous combustion effluent using a zeolite.

Other embodiments of the disclosed system and method for producing carbon dioxide will become apparent from the following detailed description, the accompanying drawings and the appended claims.

DETAILED DESCRIPTION

Figure 1:
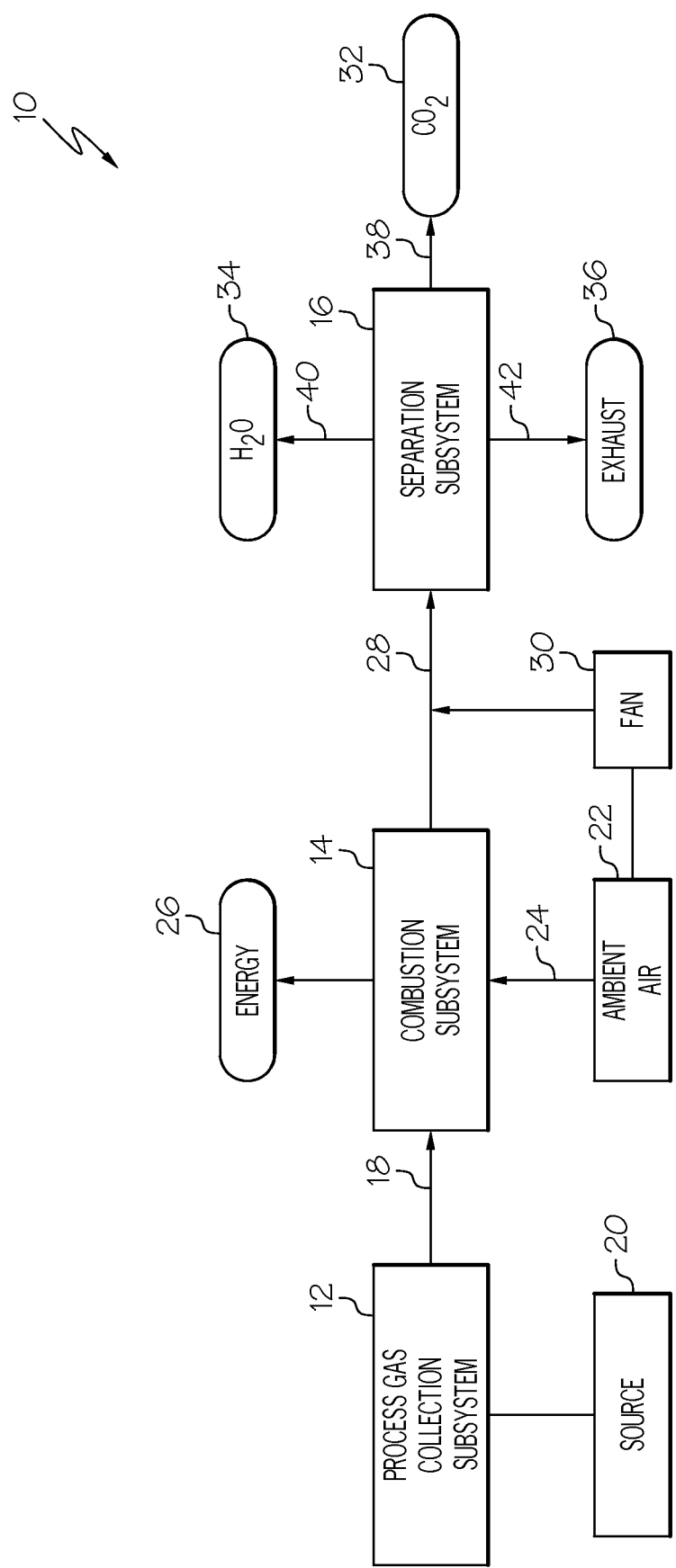
FIG. 1 is a process flow diagram of one embodiment of the disclosed system for producing carbon dioxide.

Referring to FIG. 1, one embodiment of the disclosed system for producing carbon dioxide, generally designated 10, may include a process gas collection subsystem 12, a combustion subsystem 14 and a separation subsystem 16. The disclosed system 10 may include additional subsystems without departing from the scope of the present disclosure.

The process gas collection subsystem 12 may collect a process gas 18 from a source 20, and may supply the process gas 18 to the combustion subsystem 14. The process gas collection subsystem 12 may include various pipes or the like to collect the process gas 18 from the source 20 and to transport the process gas 18 to the combustion subsystem 14. Pumps or the like may optionally be employed by the process gas collection subsystem 12 to facilitate the transport of the process gas 18.

The process gas 18 may be any gas or gaseous mixture that includes a hydrocarbon, such as methane ($CH_4$), ethane ($C_2H_6$), propane ($C_3H_8$) and/or butane ($C_4H_{10}$). In addition to the hydrocarbon, the process gas 18 may include other constituents, such as carbon dioxide, water vapor, nitrogen and/or hydrogen sulfide. The concentration of the hydrocarbon component of the process gas 18 may vary depending on the source 20 of the process gas 18.

In one particular implementation, the process gas 18 may be natural gas, which may include a significant methane component, and the source 20 may be a natural gas field or an oil field. Therefore, the process gas collection subsystem 12 may be a gas well or an oil well, and may include, for example, a series of pipes for transporting the natural gas (process gas 18) from the source 20 to the combustion subsystem 14.

The disclosed system 10 may be implemented at various locations having a source 20 of process gas 18. While the present disclosure focuses on sources 20 associated with the petroleum industry (e.g., gas fields and EOR sites), various other sources 20 may be used without departing from the scope of the present disclosure. As one example, the source 20 may be an agricultural facility, and the process gas collection subsystem 12 may be a methane capture system associated with the agricultural facility. As another example, the source 20 may be a landfill, and the process gas collection subsystem 12 may be a methane capture system associated with the landfill. Other suitable sources 20 of process gas 18 will become apparent to those skilled in the art upon reading and understanding the present disclosure.

The combustion subsystem 14 may receive the process gas 18, may mix the process gas 18 with ambient air 22 (which may be collected from the ambient environment and supplied by way of fluid line 24) to introduce oxygen to the process gas 18 (if necessary), and may combust the process gas 18. The combustion process may generate electrical energy 26 and may output a gaseous combustion effluent 28.

The electrical energy 26 generated by the combustion subsystem 14 may be used to power the various components and subsystems of the system 10, such as the process gas collection subsystem 12, the separation subsystem 16 and/or the fan 30 (discussed below). Alternatively (or additionally), the electrical energy 26 generated by the combustion subsystem 14 may be sold (e.g., to third parties and/or the electric grid). Therefore, the electrical energy 26 generated by the combustion subsystem 14 may be one of several income sources of the disclosed system 10.

The combustion subsystem 14 may include any suitable combustion apparatus or system. As one example, the combustion subsystem 14 may include an internal combustion engine with intermittent combustion, such as a diesel engine modified to run on natural gas. As another example, the combustion subsystem 14 may include a continuous combustion engine, such as a turbine (e.g., a microturbine). While a continuous combustion engine may be more efficient at producing electrical energy 26 than an internal combustion engine with intermittent combustion, a less efficient combustion subsystem 14, such as a diesel engine modified to run on natural gas, may generate more carbon dioxide and, therefore, may improve overall system economics.

The combustion subsystem 14 may convert the hydrocarbons in the process gas 18 to carbon dioxide and water. For example, the hydrocarbons in the process gas 18 may be converted to carbon dioxide and water as follows:

$$CH_4 + 2O_2 \rightarrow CO_2 + 2H_2O \quad \text{(Eq. 1)}$$

$$2C_2H_6 + 7O_2 \rightarrow 4CO_2 + 6H_2O \quad \text{(Eq. 2)}$$

$$C_3H_8 + 5O_2 \rightarrow 3CO_2 + 4H_2O \quad \text{(Eq. 3)}$$

$$2C_4H_{10} + 13O_2 \rightarrow 8CO_2 + 10H_2O \quad \text{(Eq. 4)}$$

Thus, the gaseous combustion effluent 28 may comprise carbon dioxide and water, as well as the constituents of ambient air 22 (e.g., nitrogen, oxygen) that have passed through the combustion subsystem 14 and other combustion byproducts (e.g., carbon monoxide, nitrogen oxides). As an example, when the process gas 18 is natural gas, the gaseous combustion effluent 28 may comprise about 12 percent by weight carbon dioxide.

The gaseous combustion effluent 28 may be substantially free of hydrocarbons, which may be substantially completely combusted within the combustion subsystem 14.

The gaseous combustion effluent 28 may be supplied to the separation subsystem 16. The separation subsystem 16 may separate carbon dioxide 32 and water 34 from the gaseous combustion effluent 28, and the balance of the gaseous combustion effluent 28 (e.g., nitrogen, oxygen) may be released as exhaust 36 (by way of fluid line 42). Optionally, the separated carbon dioxide 32 may be sent to carbon dioxide collection (e.g., a storage vessel or pipeline) by way of fluid line 38 and/or the separated water 34 may be sent to water collection (or discharged) by way of fluid line 40.

Thus, the carbon dioxide 32 and the water 34 may be two additional income sources of the disclosed system 10.

The separation subsystem 16 may employ various techniques to separate water and carbon dioxide from the gaseous combustion effluent 28. The type of separation technique used by the separation subsystem 16 may be dictated by various factors, including process conditions (e.g., desired purities of the collected carbon dioxide 32 and water 34) and process economics (e.g., total energy consumption of the separation subsystem 16).

While a physisorption process is described below, other techniques, such as chemisorption, vortex separation and liquefaction, may be used without departing from the scope of the present disclosure.

Figure 2:
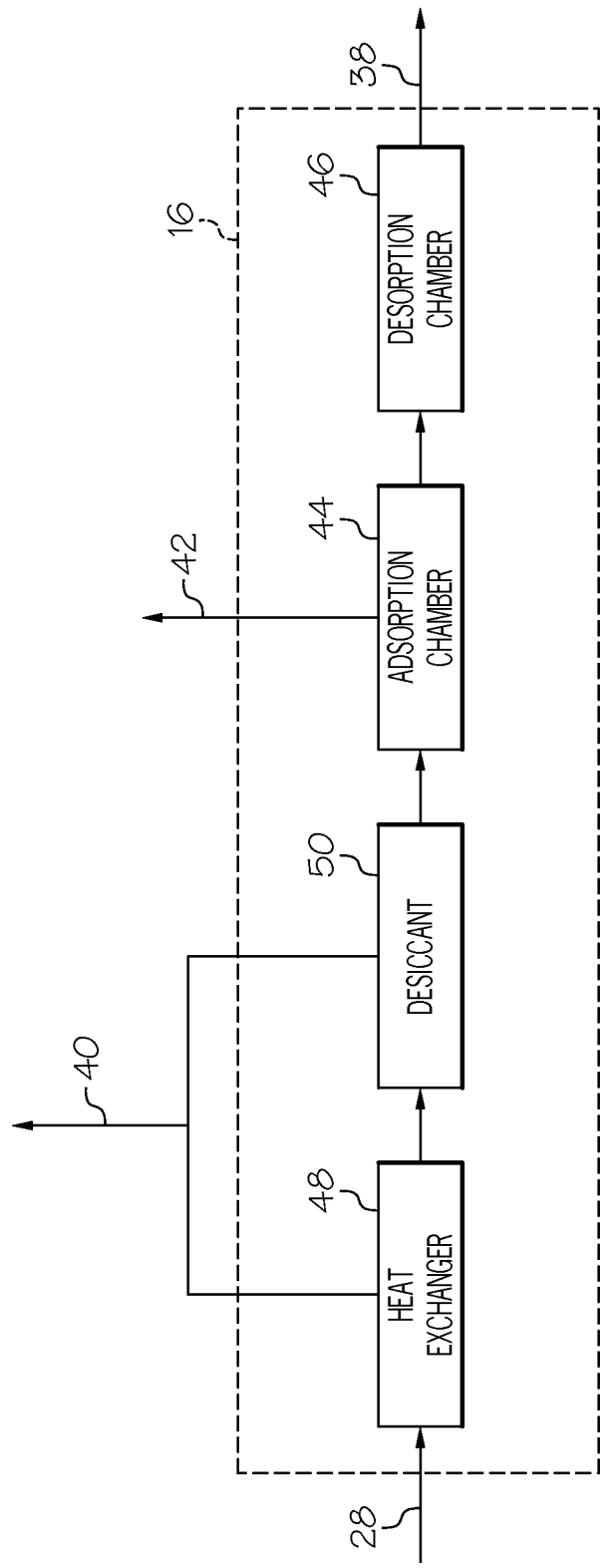
FIG. 2 is a process flow diagram of the separation subsystem of the system of FIG. 1.

Referring to FIG. 2, in one particular construction, the separation subsystem 16 may include an adsorption chamber 44. Optionally, the separation subsystem 16 may additionally include a vacuum desorption chamber 46, a heat exchanger 48 and/or a desiccant chamber 50. Use of other components is also contemplated.

The adsorption chamber 44 may receive the gaseous combustion effluent 28, and may output a substantially carbon dioxide-free gas as exhaust 36 (FIG. 1) by way of fluid line 42. The adsorption chamber 44 may include an adsorbent material that adsorbs carbon dioxide from the gaseous combustion effluent 28 by way of a physical adsorption process (physisorption).

Various adsorbent materials may be suitable for use in the adsorption chamber 44 to adsorb carbon dioxide from the gaseous combustion effluent 28. As one general example, the adsorbent material may be a molecular sieve material, such as a molecular sieve material having a 10 angstrom effective pore opening size. As one specific example, the adsorbent material may be a zeolite material, such as a zeolite 13X molecular sieve material with a ten angstrom effective pore opening size. As another specific example, the adsorbent material may be a 3A zeolite.

When a sufficient amount of carbon dioxide has been adsorbed onto the adsorbent material within the adsorption chamber 44, the adsorbed carbon dioxide may be released as the carbon dioxide output 32 (FIG. 1) by way of fluid line 38, thereby regenerating the adsorbent material. For example, when the concentration of carbon dioxide in the exhaust 36 exceeds a pre-determined threshold value (e.g., 2 percent by weight, 3 percent by weight, or 5 percent by weight), the adsorbed carbon dioxide may be released to regenerate the adsorbent material.

Various techniques may be used to release the adsorbed carbon dioxide from the adsorbent material in the adsorption chamber 44. As one example, a vacuum desorption chamber 46 (which may be the same as, or separate from, the adsorption chamber 44) may be used to desorb the carbon dioxide from the adsorbent material. A vacuum may be drawn in the vacuum desorption chamber 46 (or the adsorption chamber 44). Therefore, when the adsorbent material is ready to be regenerated, the adsorption chamber 44 may be sealed, and the vacuum may be drawn in the desorption chamber 46 (or the adsorption chamber 44), thereby drawing the carbon dioxide from the adsorbent material. A cold finger may be positioned downstream of the desorption chamber 46 (or the adsorption chamber 44) such that the desorbed carbon dioxide condenses on the cold finger. As one alternative to a cold finger, compression may be used to separate the desorbed carbon dioxide.

As another example, heating, such as with microwave energy, infrared energy or the like, may be used to release the adsorbed carbon dioxide from the adsorbent material in the adsorption chamber 44.

The heat exchanger 48 may lower the temperature of the gaseous combustion effluent 28 prior to the gaseous combustion effluent 28 entering the adsorption chamber 44. The cooling process may condense water vapor within the gaseous combustion effluent 28, which may then be output as water 34 (FIG. 1) by way of fluid line 40.

Cooling the gaseous combustion effluent 28 may be particularly advantageous when the separation subsystem 16 employs physical adsorption. Specifically, it may be advantageous to cool the gaseous combustion effluent 28 to within a certain temperature of the adsorbent material within the adsorption chamber 44 to enhance physical adsorption. As one example, the gaseous combustion effluent 28 may cooled to within about 20 degrees of the adsorbent material. As another example, the gaseous combustion effluent 28 may cooled to within about 10 degrees of the adsorbent material. As another example, the gaseous combustion effluent 28 may cooled to within about 5 degrees of the adsorbent material. As yet another example, when the adsorbent material is at ambient conditions (25° C.), the gaseous combustion effluent 28 may be cooled to at most about 35° C. (e.g., to about 30° C.).

As an alternative to the heat exchanger 48 (or in addition to the heat exchanger 48), an air mover 30 (FIG. 1), such as a fan, may introduce ambient air 22 (FIG. 1) to the gaseous combustion effluent 28 prior to the separation subsystem 16 or within the separation subsystem 16. The introduction of ambient air 22 to the gaseous combustion effluent 28 may cool the gaseous combustion effluent 28, though additional cooling by way of the heat exchanger 48 may still be required to achieve the desired temperature drop of the gaseous combustion effluent 28.

Since ambient air 22 includes only about 400 ppm carbon dioxide, introducing ambient air 22 to the gaseous combustion effluent 28 may dilute the carbon dioxide content of the gaseous combustion effluent 28. In one expression, the amount of ambient air 22 introduced to the gaseous combustion effluent 28 may be controlled such that the concentration of carbon dioxide within the gaseous combustion effluent 28 does not drop below about 12 percent by weight. In another expression, the amount of ambient air 22 introduced to the gaseous combustion effluent 28 may be controlled such that the concentration of carbon dioxide within the gaseous combustion effluent 28 does not drop below about 10 percent by weight. In yet another expression, the amount of ambient air 22 introduced to the gaseous combustion effluent 28 may be controlled such that the concentration of carbon dioxide within the gaseous combustion effluent 28 does not drop below about 5 percent by weight.

Thus, cooling the gaseous combustion effluent 28 may enhance carbon dioxide collection within the adsorption chamber 44 of the separation subsystem 16.

The optional desiccant chamber 50 may remove any water remaining in the gaseous combustion effluent 28 prior to the gaseous combustion effluent 28 entering the adsorption chamber 44. The water vapor removed at the desiccant chamber 50 may be output as water 34 (FIG. 1) by way of fluid line 40.

The desiccant chamber 50 may include a desiccant material. A variety of desiccant materials may be suitable for use in the desiccant chamber 50 to remove substantially all water from the gaseous combustion effluent 28. As one general example, the desiccant material may be a molecular sieve material. As one specific example, the desiccant material may be a molecular sieve material with an alkali metal alumino-silicate structure that has an effective pore opening of three angstroms.

Thus, the heat exchanger 48 and the desiccant chamber 50 may remove substantially all of the water (gas and liquid) originally contained in the gaseous combustion effluent 28. The resulting dry gaseous combustion effluent 28 may then be passed to the adsorption chamber 44 where the carbon dioxide may then be separated from the gaseous combustion effluent 28.

Accordingly, the disclosed system 10 may use a hydrocarbon-containing process gas 18 to produce multiple sources of potential income: electrical energy, carbon dioxide and water. Furthermore, the disclosed system 10 may be used to produce carbon dioxide 32 at any source 20 of hydrocarbon-containing process gas 18 (e.g., methane), thereby functioning as a virtual pipeline that eliminates the need for long distance transport of carbon dioxide, such as by freight or physical pipeline. For example, the system 10 or components thereof (e.g., the combustion subsystem 14 and the separation subsystem 16) may be mounted on a mobile platform, such as a truck bed, thereby rendering the system 10 mobile and capable of being implemented where needed.

Figure 3:
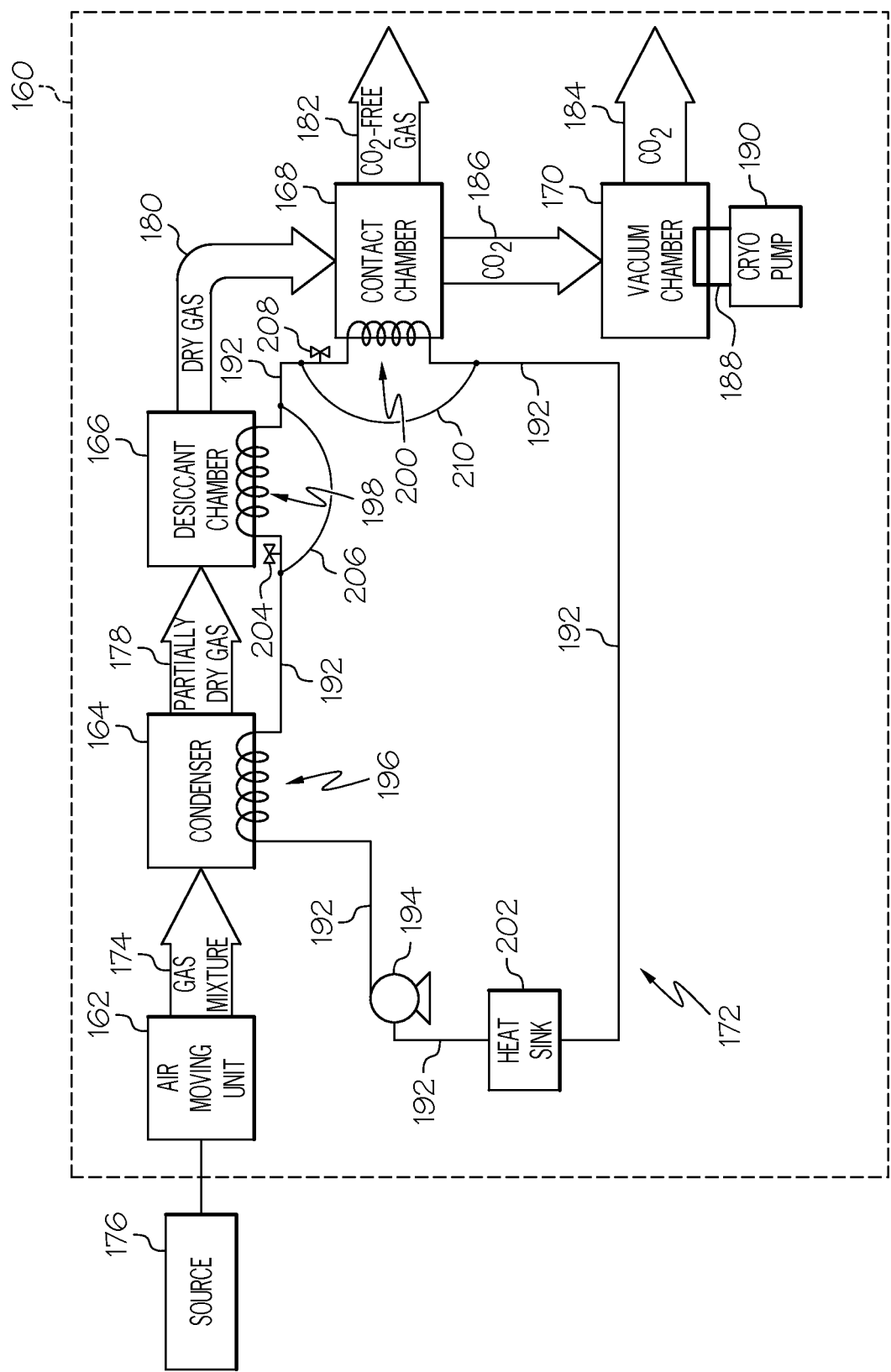
FIG. 3 is a process flow diagram of an alternative separation subsystem, which may be used as the separation subsystem of the system of FIG. 1.

An alternative embodiment of the disclosed separation subsystem, generally designated 160, is shown in FIG. 3. The separation subsystem 160 may include an air moving unit 162, a condenser 164, a desiccant chamber 166, a contact chamber 168, a vacuum chamber 170 and a heat transfer assembly 172. The separation subsystem 160 may include additional components and subsystems without departing from the scope of the present disclosure.

The separation subsystem 160 may be supplied with a gaseous mixture 174 by a source 176. The source 176 may be any source of the gaseous mixture 174. The gaseous mixture 174 may be any carbon dioxide-containing gas. For example, the gaseous mixture 174 may be a gaseous mixture, and may include carbon dioxide as well as other constituents, such as water vapor, nitrogen, oxygen and the like.

The gaseous mixture 174 may be at an elevated temperature relative to ambient conditions such that the gaseous mixture 174 contains excess heat. In one expression, the gaseous mixture 174 may be at a temperature of at least 25° C. In another expression, the gaseous mixture 174 may be at a temperature of at least 50° C. In another expression, the gaseous mixture 174 may be at a temperature of at least 100° C. In another expression, the gaseous mixture 174 may be at a temperature of at least 200° C. In another expression, the gaseous mixture 174 may be at a temperature of at least 300° C. In another expression, the gaseous mixture 174 may be at a temperature of at least 400° C. In yet another expression, the gaseous mixture 174 may be at a temperature of at least 500° C.

In one implementation, the source 176 may be the combustion subsystem 14 (FIG. 1) and gaseous mixture 174 may be the combustion effluent 28 (FIG. 1) of the disclosed system 10 (FIG. 1) for producing carbon dioxide.

In another implementation, the source 176 may be a power plant and the gaseous mixture 174 may be the effluent from the power plant. For example, the power plant may be a hydrocarbon-burning power plant, such as a natural gas power plant, and the gaseous mixture 174 may be the combustion byproducts of the hydrocarbon-burning power plant. Therefore, the gaseous mixture 174 may be at a relatively high temperature relative to ambient conditions, and may include significant quantities of carbon dioxide as a result of the combustion reaction of oxygen with the hydrocarbon. Optionally, separating devices, such as scrubbers, may be used between the source 176 and the air moving unit 162 to remove contaminants (e.g., metals) from the effluent before the gaseous mixture 174 enters the separation subsystem 160.

The air moving unit 162, while optional, may facilitate the transfer of the gaseous mixture 174 from the source 176 to the condenser 164. The air moving unit 162 may be a fan, a blower or the like, and may control the flow (e.g., the flow rate) of the gaseous mixture 174 to the condenser 164. The use of multiple air moving units 162 is also contemplated.

The condenser 164 may receive the gaseous mixture 174 from the air moving unit 162, and may condense any water vapor in the gaseous mixture 174 to output a partially (if not fully) dry gas 178. Various condenser types and configurations may be used, and use of a single stage or multi-stage condenser is also contemplated.

The condenser 164 may condense water vapor in the gaseous mixture 174 by cooling the gaseous mixture 174. The heat extracted from the gaseous mixture 174 by the condenser 164 during cooling may be transferred to the heat transfer assembly 172 for further use, as is described in greater detail below.

Thus, the condenser 164 may lower the temperature of the gaseous mixture 174. In one manifestation, the condenser 164 may lower the temperature of the gaseous mixture 174 by at least 10° C. In another manifestation, the condenser 164 may lower the temperature of the gaseous mixture 174 by at least 20° C. In another manifestation, the condenser 164 may lower the temperature of the gaseous mixture 174 by at least 30° C. In another manifestation, the condenser 164 may lower the temperature of the gaseous mixture 174 by at least 40° C. In another manifestation, the condenser 164 may lower the temperature of the gaseous mixture 174 by at least 50° C. In another manifestation, the condenser 164 may lower the temperature of the gaseous mixture 174 by at least 100° C. In another manifestation, the condenser 164 may lower the temperature of the gaseous mixture 174 by at least 150° C. In yet another manifestation, the condenser 164 may lower the temperature of the gaseous mixture 174 by at least 200° C.

The water removed from the gaseous mixture 174 by the condenser 164 may be collected as a byproduct. The collected water may then be used for any suitable purpose or discharged to a drain.

The desiccant chamber 166 may receive the partially dry gas 178 from the condenser 164, and may output a substantially dry gas 180. The desiccant chamber 166 may include a desiccant material to remove substantially all of the water remaining in the partially dry gas 178.

A variety of desiccant materials may be suitable for use in the desiccant chamber 166 to remove substantially all water from the partially dry gas 178. As one general example, the desiccant material may be a molecular sieve material. As one specific example, the desiccant material may be a molecular sieve material with an alkali metal alumino-silicate structure that has an effective pore opening of three angstroms. As another specific example, the desiccant material may be (or may include) 3A zeolite. Other desiccant materials may be also be used, including molecular sieve materials having different structures and/or effective pore sizes.

The desiccant material may become exhausted after collecting a certain quantity of water and, therefore, may require regeneration. Regeneration of the desiccant material may be effected by applying heat to the desiccant material, such as by way of the heat transfer assembly 172, as described in greater detail below. Other techniques, such as applying a vacuum, may also be used to regenerate the desiccant material. Combinations of techniques, such as heat and vacuum, are also contemplated.

The water removed from the partially dry gas 178 by the desiccant chamber 166 may be collected as a byproduct. The collected water may then be used for any suitable purpose or discharged to a drain.

Thus, the condenser 164 and the desiccant chamber 166 may remove substantially all of the water originally contained in the gaseous mixture 174. The resulting dry gas 180 may then be used for carbon dioxide collection.

The contact chamber 168 may receive the dry gas 180 from the desiccant chamber 166, and may output a substantially carbon dioxide-free dry gas 182. The contact chamber 168 may include an adsorbent material that adsorbs carbon dioxide from the dry gas 180.

A variety of adsorbent materials may be suitable for use in the contact chamber 168 to adsorb carbon dioxide from the dry gas 180. As one example, the adsorbent material may be a molecular sieve material, such as a molecular sieve material having a 10 angstrom effective pore opening size. As another example, the molecular sieve material may be a zeolite material, such as 13X zeolite.

When a sufficient amount of carbon dioxide has been adsorbed to the adsorbent material within the contact chamber 168, the adsorbed carbon dioxide may be released (desorbed) from the adsorbent material to form the carbon dioxide output stream 184. The process of desorbing the adsorbed carbon dioxide from the adsorbent material may regenerate the adsorbent material, thereby allowing further use of the adsorbent material.

The adsorbed carbon dioxide may be desorbed from the adsorbent material in the contact chamber 168 by subjecting the adsorbent material to vacuum. Optionally, heat may be supplied to the contact chamber 168 to heat the adsorbent material (and adsorbed carbon dioxide), such as by the heat transfer assembly 172, to further promote the desorption of the carbon dioxide from the adsorbent material.

As one example, the contact chamber 168 may be substantially sealed to the flow of gas. Then, vacuum may be applied to the contact chamber 168 by way of the vacuum chamber 170. Therefore, the applied vacuum and (optional) heat may facilitate the release (desorption) of carbon dioxide from the adsorbent material in the contact chamber 168 to the vacuum chamber 170, as shown by arrow 186.

As another example, the contact chamber 168 and the vacuum chamber 170 may one and the same. Therefore, when the adsorbent material is ready to be regenerated, the adsorption chamber 168/vacuum chamber 170 may be sealed. Then, vacuum may be applied, thereby drawing the carbon dioxide from the adsorbent material.

The carbon dioxide released from the adsorbent material may be transitioned to a solid using any suitable technique. For example, the carbon dioxide released from the adsorbent material may be transitioned to a solid using a cooled surface 188, such as a cold finger. The cooled surface 188 may be positioned within the vacuum chamber 170, as shown in FIG. 3. Alternatively, the cooled surface 188 may be positioned downstream of the vacuum chamber 170. Subsequent heating may then be used to release the carbon dioxide from the cooled surface 188 as a gas.

The cooled surface 188 may be cooled by a cryogenic pump 190 that circulates a cold liquid through the cooled surface 188. The cooled surface 188 may be cooled to a temperature that is sufficiently low (e.g., about −78° C. or less) to cause the gaseous carbon dioxide to solidify on the cooled surface 188.

The carbon dioxide output stream 184, which may be a gas, a solid or a liquid, may be sent for storage, for downstream use, or for transport (e.g., to a job site).

The heat transfer assembly 172 may thermally couple the condenser 164 to one or more other subsystems to utilize the heat collected at the condenser 164. As one example, the heat transfer assembly 172 may thermally couple the condenser 164 to the desiccant chamber 166. As another example, the heat transfer assembly 172 may thermally couple the condenser 164 to the contact chamber 168. As another example, the heat transfer assembly 172 may thermally selectively couple the condenser 164 to both the desiccant chamber 166 and the contact chamber 168.

The heat transfer assembly 172 may include a fluid line 192, a pump 194, heat exchangers 196, 198, 200 and an optional heat sink 202. The first heat exchanger 196 may be associated with the condenser 164, and may collect heat from the gaseous mixture 174 at the condenser 164. The second heat exchanger 198 may be associated with the desiccant chamber 166, and may transfer heat to the desiccant chamber 166, such as during regeneration of the desiccant material. The third heat exchanger 200 may be associated with the contact chamber 168, and may transfer heat to the contact chamber 168, such as during the desorption of carbon dioxide from the adsorbent material.

The fluid line 192 may fluidly couple the first heat exchanger 196 with the second and third heat exchangers 198, 200. The pump 194 may circulate a cooling fluid (e.g., water, glycol or the like) through the fluid line 192 such that the cooling fluid collects heat from the first heat exchanger 196 and transfers the heat to one or more other subsystems. For example, the cooling fluid may transfer collected heat to the desiccant chamber 166 by way of the second heat exchanger 198 and/or to the contact chamber 168 by way of the third heat exchanger 200.

A first valve 204 may be coupled to the fluid line 192 proximate the desiccant chamber 166 to control the flow of cooling fluid to the second heat exchanger 198. A bypass line 206 may be provided to bypass the second heat exchanger 198 when the first valve 204 is closed.

A second valve 208 may be coupled to the fluid line 192 proximate the contact chamber 168 to control the flow of cooling fluid to the third heat exchanger 200. A bypass line 210 may be provided to bypass the third heat exchanger 200 when the second valve 208 is closed.

Thus, the valves 204, 208 may be selectively actuated to control when heat is applied to the desiccant chamber 166 and the contact chamber 168, respectively.

The fluid line 192 may also be in fluid communication with the heat sink 202. The heat sink 202 may remove residual heat from the cooling fluid before the cooling fluid is recirculated back through the heat transfer assembly 172. Heat transfer assemblies that do not recirculate cooling fluid are also contemplated.

Figure 4:
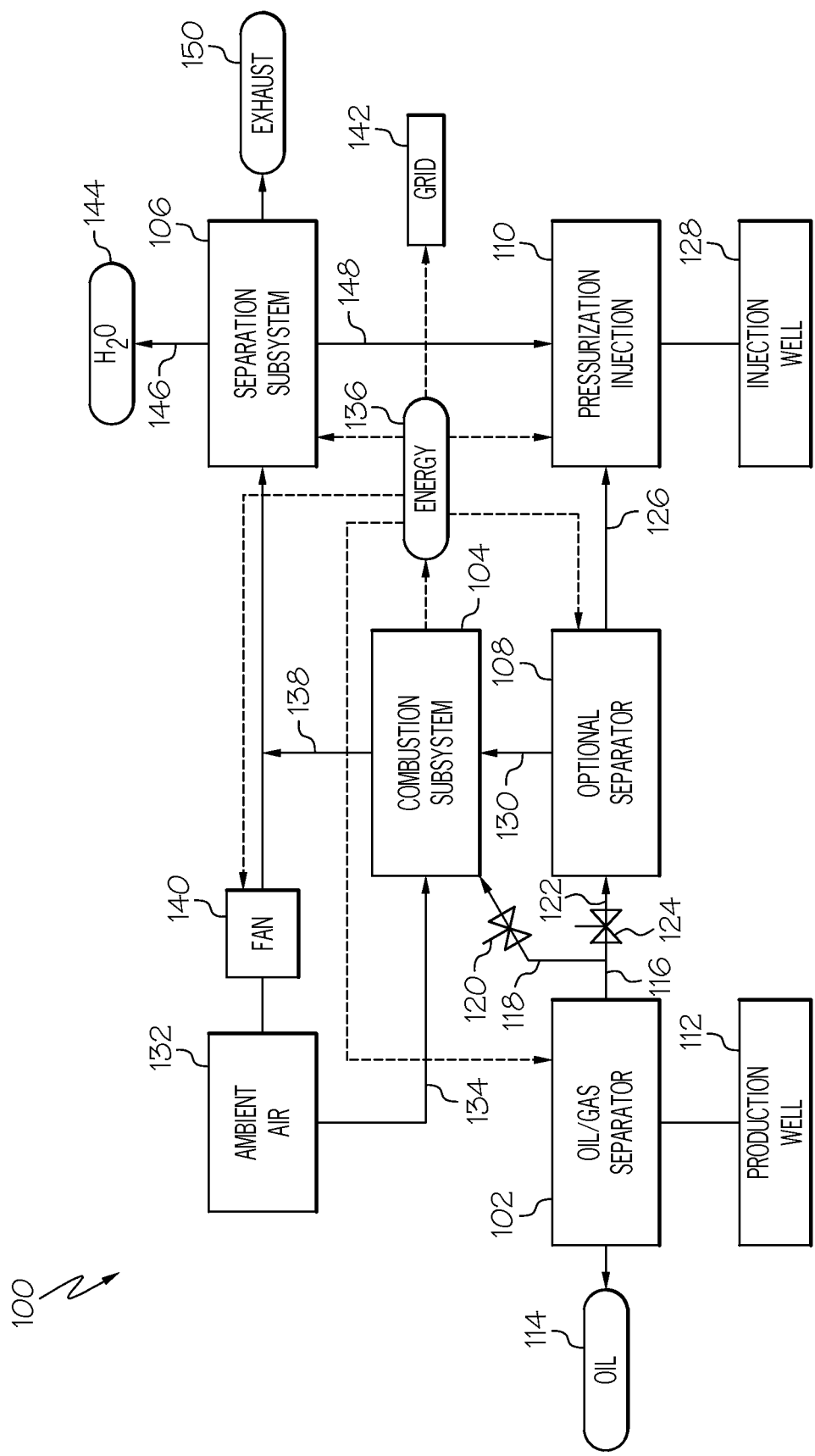
FIG. 4 is a process flow diagram of another embodiment of the disclosed system for producing carbon dioxide.

Referring to FIG. 4, another embodiment of the disclosed system for producing carbon dioxide, generally designated 100, may be implemented at an enhanced oil recovery site. The system 100 may include an oil/gas separator 102 (which serves as a process gas collection subsystem), a combustion subsystem 104 and a separation subsystem 106, as well as an optional separator 108 and a pressurization injection subsystem 110.

The oil/gas separator 102 may receive a mixture of oil and gas from a production well 112, and may separate the mixture into an oil component 114 and a gas component 116. The gas component 116 from the oil/gas separator 102 may be the process gas of the system 100.

Thus, the process gas 116 may include methane, carbon dioxide and water, among other possible constituents. The carbon dioxide component of the process gas 116 may include naturally occurring carbon dioxide, as well as carbon dioxide recovered from the well 112 as a result of the EOR process.

The oil/gas separator 102 may supply the process gas 116 to the combustion subsystem 104. For example, a fluid line 118 (which may be controlled by a valve 120) may selectively fluidly couple the oil/gas separator 102 with the combustion subsystem 104 such that the collected process gas 116 may directly flow to the combustion subsystem 104.

Alternatively, a separator 108 may be interposed between the oil/gas separator 102 and the combustion subsystem 104. The separator 108 may receive the process gas 116 by way of fluid line 122 (which may be controlled by a valve 124), and may separate (at least partially) the carbon dioxide from the methane. The separated carbon dioxide may be sent to the pressurization injection subsystem 110 by way of fluid line 126 for injection into the injection well 128. The separated methane may be sent to the combustion subsystem 104 by way of fluid line 130.

The optional separator 108 may employ any available technique to separate the carbon dioxide from the methane in the process gas 116.

As one example, the separator 108 may employ vortex flow to effect separation of the carbon dioxide from the methane. For example, the separator 108 may include a static vortex separator and the process gas 116 may be pumped into the vortex separator such that a vortex flow path is induced, thereby causing separation of the carbon dioxide from the methane due to the differences in the molecular weights of carbon dioxide and methane.

As another example, the separator 108 may employ liquefaction to effect separation of the carbon dioxide from the methane. For example, the separator 108 may include a pressure vessel and a pump, wherein the pump pumps the process gas 116 into the pressure vessel at a pressure sufficient to separate the process gas 116 into a liquid fraction and a gaseous fraction. The liquid fraction, which may be primarily comprised of carbon dioxide, may then easily be separated from the gaseous fraction.

As yet another example, the separator 108 may employ physisorption to effect separation of the carbon dioxide from the methane, similar to the separation processes used by separation subsystems 16, 160 (FIGS. 2 and 3). For example, the separator 108 may include an adsorbent material, such as a zeolite. The process gas 116 may be brought into contact with the adsorbent material such that the carbon dioxide in the process gas 116 adsorbs onto the adsorbent material, leaving the methane in the process gas 116. The adsorbed carbon dioxide may then be released from the adsorbent material by heat or vacuum, thereby regenerating the adsorbent material. Physisorption is described in greater detail below.

At this point, those skilled in the art will appreciate that the decision to use the optional separator 108 may be driven by operating conditions (e.g., process gas composition) and overall system economics. In some situations it may be more efficient to use the optional separator 108, while in other situations it may be more efficient to pass the process gas 116 to the combustion subsystem 104 without separation (i.e., to allow the carbon dioxide component of the process gas 116 to pass through the combustion subsystem 104).

The combustion subsystem 104 may receive the process gas 116 (or the separated methane stream 130), may mix the process gas 116 with ambient air 132 (which may be supplied by way of fluid line 134) to introduce oxygen to the process gas 116 (if necessary), and may combust the process gas 116. The combustion process may generate electrical energy 136 and may output a gaseous combustion effluent 138.

The electrical energy 136 generated by the combustion subsystem 104 may be used to power the various components of the system 10, such as the oil/gas separator 102, the separation subsystem 106, the optional separator 108, the pressurization injection subsystem 110 and/or the air moving unit 140. Alternatively (or additionally), the electrical energy 136 generated by the combustion subsystem 104 may be sold to the electric grid 142. Therefore, the electrical energy 136 generated by the combustion subsystem 104 may be one of several income sources of the disclosed system 100.

The gaseous combustion effluent 138 may optionally be mixed with ambient air 132 (by way of air moving unit 140), as described above in connection with system 10, and may be sent to the separation subsystem 106, which may separate carbon dioxide and water from the gaseous combustion effluent 138. The separation subsystem 106 may be configured as described above in connection with separation subsystems 16, 160 (FIGS. 2 and 3).

The water 144 separated from the gaseous combustion effluent 138 at the separation subsystem 106 may be sent to water collection (e.g., a storage vessel or pipeline) by way of fluid line 146. Therefore, the water 144 produced at the separation subsystem 106 may provide an additional income source of the disclosed system 100. Alternatively, the water 144 may be discharged (e.g., to a drain).

The carbon dioxide (fluid line 148) separated from the gaseous combustion effluent 138 at the separation subsystem 106 may be sent to the pressurization injection subsystem 110, which may inject the carbon dioxide into the injection well 128. The pressurization injection subsystem 110 may combine the carbon dioxide (fluid line 148) separated from the gaseous combustion effluent 138 with the carbon dioxide (fluid line 126) optionally separated from the process gas 116 at separator 108.

The balance of the gaseous combustion effluent 138 (e.g., nitrogen, oxygen) exiting the separation subsystem 106 may be released as exhaust 150. The exhaust 150 may be substantially free of carbon dioxide, methane and water.

Accordingly, the disclosed system 100 may recycle carbon dioxide injected into an EOR injection well 128, and may use the methane extracted from the production well 112 to produce energy and additional quantities of carbon dioxide. Therefore, the disclosed system 100 may produce on-site the carbon dioxide required for EOR, thereby reducing or eliminating the high cost associated with transporting carbon dioxide to EOR sites.

Figure 5:
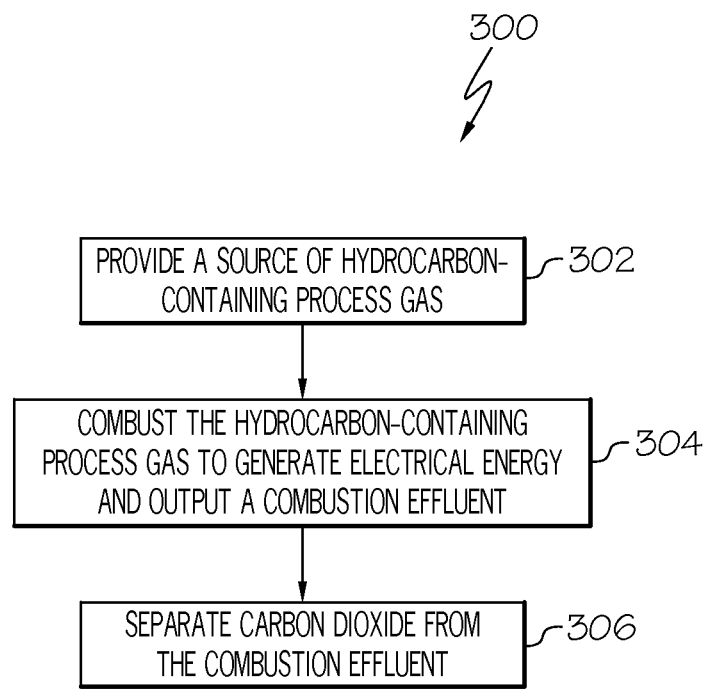
FIG. 5 is a flow chart depicting one embodiment of the disclosed method for producing carbon dioxide.

Referring to FIG. 5, disclosed is a method 300 for producing carbon dioxide. The method 300 may begin at Block 302 with the step of providing a source of hydrocarbon-containing process gas.

At Block 304, the hydrocarbon-containing process gas may be combusted to generate a gaseous combustion effluent (a gaseous mixture) and electrical energy. Combustion may occur in the presence of oxygen, such as by mixing ambient air with the hydrocarbon-containing process gas. The combustion step may convert most (if not all) of the hydrocarbon in the hydrocarbon-containing process gas into carbon dioxide and water.

At Block 306, carbon dioxide may be separated from the gaseous combustion effluent. The separated carbon dioxide may be collected for use, sale or sequestration. Additionally, water may also be separated from the gaseous combustion effluent. The water component may be collected for use or sale, or may be discharged. The exhaust from the separation step (Block 306) may be substantially free of carbon dioxide and water, and may be released to the atmosphere.

Accordingly, the disclosed method 300 may produce carbon dioxide (as well as water and electrical energy) at any source of hydrocarbon-containing process gas, thereby reducing or eliminating the costs associated with transporting carbon dioxide.

Figure 6:
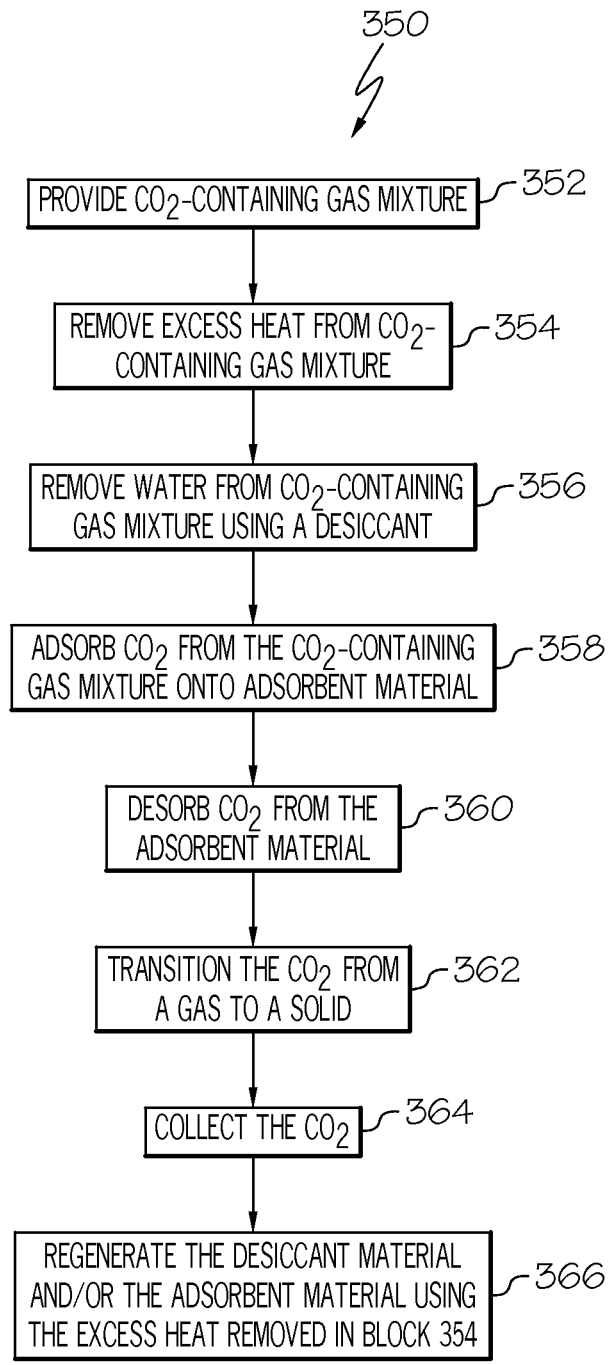
FIG. 6 is a flow chart depicting one embodiment of the disclosed method for separating carbon dioxide from a gaseous mixture.

Referring to FIG. 6, also disclosed is a method, generally designed 350, for separating carbon dioxide from a gaseous mixture. The separation method 350 may begin at Block 352 with the step of obtaining a carbon dioxide-containing gaseous mixture. As described above, the gaseous mixture may be the gaseous combustion effluent generated using the disclosed method 300 (FIG. 5) for producing carbon dioxide. Use of other carbon dioxide-containing gaseous mixtures is also contemplated.

As shown at Block 354, the excess heat may be removed from the gaseous mixture. The excess heat may be removed at a condenser, which may also beneficially remove some (if not all) water vapor from the gaseous mixture. Residual water may be removed from the gaseous mixture using a desiccant, as shown at Block 356, to yield a substantially dry gaseous mixture.

Carbon dioxide from the dry gaseous mixture may be adsorbed onto an adsorbent material, as shown at Block 358. Then, as shown at Block 360, adsorbed carbon dioxide may be desorbed, such as by vacuum and/or heat. The desorbed carbon dioxide may be transitioned into a solid, as shown at Block 362, and the carbon dioxide may be collected, as shown at Block 364.

As shown at Block 366, the excess heat removed from the gaseous mixture at Block 354 may be used to regenerate the desiccant and/or the adsorbent material. Using the heat collected at Block 354 during other steps of the method 350 is also contemplated.

Accordingly, the disclosed separation method 350 may facilitate the separation of carbon dioxide from a gaseous mixture. The separation method 350 may collect excess heat from a carbon dioxide-containing gaseous mixture—heat which must be removed anyway—and may use the collected heat in connection with one or more other subsystems, thereby reducing overall energy needs. As such, the separation method 350 may be useful in various applications, including the disclosed method 300 for producing carbon dioxide.

Although various embodiments of the disclosed system and method for producing carbon dioxide have been shown and described, modifications may occur to those skilled in the art upon reading the specification. The present application includes such modifications and is limited only by the scope of the claims.

What is claimed is:

1. A method for producing carbon dioxide comprising the steps of:
   combusting a process gas comprising a hydrocarbon to generate a gaseous mixture, said gaseous mixture comprising carbon dioxide and water;
   removing at least a portion of said water from said gaseous mixture to form a substantially dry gaseous mixture, wherein said step of removing said water comprises:
      removing heat from said gaseous mixture to condense a portion of said water; and
      removing an additional amount of said water from said gaseous mixture using a desiccant material;
   adsorbing at least a portion of said carbon dioxide from said dry gaseous mixture onto an adsorbent material;
   desorbing said adsorbed carbon dioxide from said adsorbent material by heating said adsorbent material while drawing a vacuum; and
   transferring said heat removed during said removing step to at least one of said desiccant material and said adsorbent material.

2. The method of claim 1 wherein said process gas is natural gas.

3. The method of claim 1 wherein said desiccant material comprises a molecular sieve material.

4. The method of claim 3 wherein said molecular sieve material comprises 3A zeolite.

5. The method of claim 1 wherein said adsorbent material comprises a molecular sieve material.

6. The method of claim 5 wherein said molecular sieve material comprises 13X zeolite.

7. The method of claim 1 wherein said heating of said adsorbent material comprising microwave energy.

8. The method of claim 1 further comprising the step of transitioning said desorbed carbon dioxide from a gas to a solid.

9. A system for producing carbon dioxide from a process gas, said system comprising:
   a combustion subsystem configured to combust said process gas and output a gaseous mixture comprising carbon dioxide and water;
   a condenser for removing heat from said gaseous mixture, wherein said condenser condenses at least a portion of said water in said gaseous mixture;
   a desiccant material for removing an additional amount of said water from said gaseous mixture to produce a substantially dry gas;
   an adsorbent material for adsorbing at least a portion of said carbon dioxide from said dry gas, wherein said adsorbent material is housed in a contact chamber;
   a heat transfer assembly for collecting said heat removed from said gaseous mixture at said condenser and transferring said heat to at least one of said desiccant material and said adsorbent material; and
   a vacuum source in selective communication with said contact chamber, wherein said vacuum source draws a vacuum in said contact chamber when said adsorbent material is being heated to desorb said carbon dioxide therefrom.

10. The system of claim 9 wherein said heat transfer assembly transfers said heat to said desiccant material and said adsorbent material.

11. The system of claim 9 wherein said process gas is natural gas.

12. The system of claim 9 wherein said desiccant material comprises a molecular sieve material.

13. The system of claim 12 wherein said molecular sieve material comprises 3A zeolite.

14. The system of claim 9 wherein said adsorbent material comprises a molecular sieve material.

15. The system of claim 14 wherein said molecular sieve material comprises 13X zeolite.

16. The system of claim 9 further comprising a microwave energy source positioned to selectively transfer microwave energy to said adsorbent material.

\* \* \* \* \*